(12) United States Patent
Kaneko et al.

(10) Patent No.: US 6,386,062 B1
(45) Date of Patent: May 14, 2002

(54) FIXING DEVICE FOR STEERING WHEEL

(75) Inventors: Kazuhiro Kaneko; Toshiyuki Sugiyama, both of Shizuoka (JP); Michael Anthony Bunce, Oxford, OH (US); Tsuyoshi Watanabe, Shizuoka (JP); Kevin Dominic Delaney, Shizuoka (JP); Mikio Ochiai, Shizuoka (JP)

(73) Assignee: Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 09/393,702

(22) Filed: Sep. 10, 1999

(30) Foreign Application Priority Data

Sep. 21, 1998 (JP) .............................................. 10-266248

(51) Int. Cl.⁷ .............................. B62D 1/04; G05G 1/10
(52) U.S. Cl. ......................... 74/552; 280/775; 403/259; 403/261; 403/359
(58) Field of Search ............................ 74/552; 403/259, 403/261, 359; 280/775–778

(56) References Cited

U.S. PATENT DOCUMENTS

| | | | | |
|---|---|---|---|---|
| 5,144,861 A | * | 9/1992 | Nishijima et al. ...... | 403/259 X |
| 5,617,763 A | | 4/1997 | Cymbal ................... | 74/552 |
| 5,768,948 A | * | 6/1998 | Hosoi et al. ............ | 74/552 |
| 5,816,112 A | | 10/1998 | Hosoi et al. ............ | 74/552 |
| 5,848,806 A | | 12/1998 | Hosoi et al. ............ | 280/779 |
| 5,855,449 A | | 1/1999 | Thomas ................... | 403/262 |

FOREIGN PATENT DOCUMENTS

| | | |
|---|---|---|
| DE | 197 29 688 | 1/1991 |
| DE | 44 15 765 | 11/1995 |
| DE | 295 16 622 | 3/1996 |
| DE | 196 33 882 | 2/1998 |
| JP | 9-226600 | 9/1997 |

* cited by examiner

*Primary Examiner*—Vinh T. Luong
(74) *Attorney, Agent, or Firm*—Foley & Lardner

(57) ABSTRACT

An arrangement includes a fixing device for a steering wheel that is mounted to a boss of the steering wheel to press the boss in a first direction of engaging the steering wheel with a steering shaft and is engaged with an annular groove of the steering shaft. A pressing device is mounted to the boss to press the steering shaft in a second direction opposite to the first direction so as to release the steering wheel from the steering shaft.

7 Claims, 9 Drawing Sheets

FIXING DEVICE FOR STEERING WHEEL

BACKGROUND OF THE INVENTION

The present invention relates to a device for fixing a steering wheel to a steering shaft.

Conventionally, assembling of a steering wheel of motor vehicles is carried out as follows. With an air-bag device mounted in advance, a steering wheel is provided to an assembling process where the steering wheel is fixed to a steering shaft, then a connector on the vehicle-body side is connected to an outside terminal of a rotary cable connector on the steering-wheel side. According to this assembling method, examination and quality control of the air-bag device, horn switch, etc. can be carried out in advance in another process, resulting in excellent assembling efficiency and improved yield of steering wheels. A steering wheel suitable for this assembling method is known, for example, in DE 44 15 765 A1 and JP-A 9-226600.

With a fixing device for a steering wheel as disclosed in DE 44 15 765 A1, a serration formed at a boss of the steering wheel is engaged with a serration formed at an end of the steering shaft, then a fixing screw of the boss is tightened to have an end fit in an annular groove of the steering shaft, obtaining the steering wheel fixed to the steering shaft.

With a fixing device for a steering wheel as disclosed in JP-A 9-226600, both ends of a yoke engaged with a serration of the steering shaft are tightened by a bolt to reduce, the diameter of the yoke, obtaining the steering wheel fixed to the steering shaft.

The apparatus of each reference includes an air-bag device mounted in a pad integrated with the steering wheel.

With the known fixing device for a steering wheel wherein the serration of the steering wheel is engaged with that of the steering shaft to mount the steering wheel to the steering shaft, when detaching the steering wheel from the steering shaft, the serration of the steering wheel should be separated from that of the steering shaft by using a screw tool such as a puller.

With the known apparatus including the air-bag device mounted in the pad integrated with the steering wheel, however, since the boss for connecting the steering shaft and the steering wheel is concealed by the pad, which forms an obstacle for applying the screw tool, causing an inconvenience of difficult removal of the steering wheel, etc.

When using taper serrations to mount the steering wheel to the steering shaft, the taper serrations are firmly engaged with each other through tightening upon mounting of the steering wheel, causing another inconvenience of time-consuming removal of the steering wheel, etc.

If the angles of the taper serrations are reduced to prevent such inconvenience, a backlash is apt to occur between the steering wheel and the steering shaft after mounting, requiring increased machining accuracy of the taper serrations.

However, increasing of the machining accuracy of the taper serrations requires the use of an accurate machine and a lowering of a machining speed, reducing the productivity, resulting in increased manufacturing cost. Simple adoption of severe dimension control increases a proportion defective to deteriorate a yield of steering wheels and cause difficult assembling due to reduced clearance between two engaged parts. Therefore, even if, as shown in the above reference, the steering wheel and the air-bag device are modularized to rationalize a vehicle-body assembling process, inconveniences arise such as increased manufacturing cost and assembling time.

It is, therefore, an object of the present invention to provide a fixing device for a steering wheel that enables easy mounting and detachment of the steering wheel with a steering-wheel main body and an air-bag device modularized.

SUMMARY OF THE INVENTION

One aspect of the present invention lies in providing an arrangement, comprising:
- a steering shaft having an axis and an end formed with a groove in a direction of intersecting said axis, said end including a first rotation stopper and a first fit-amount restrainer;
- a steering wheel;
- a boss fixed to said steering wheel, said boss including a second rotation stopper engaged with said first rotation stopper of said steering shaft and a second fit-amount restrainer abutting on said first fit-amount restrainer of said steering shaft, said boss detachably mounting said steering wheel to said steering shaft;
- a fixing device mounted to said boss, said fixing device pressing said boss in a first direction of engaging said steering wheel with said steering shaft, said fixing device being engaged with said groove of said steering shaft; and
- a pressing device mounted to said boss, said pressing device pressing said steering shaft in a second direction opposite to said first direction so as to release said steering wheel from said steering shaft.

Another aspect of the present invention lies in providing an arrangement, comprising:
- a steering shaft having an axis and an end formed with a groove in a direction of intersecting said axis, said end including a first rotation stopper and a first fit-amount restrainer;
- a steering wheel;
- a boss fixed to said steering wheel, said boss including a second rotation stopper engaged with said first rotation stopper of said steering shaft and a second fit-amount restrainer abutting on said first fit-amount restrainer of said steering shaft, said boss detachably mounting said steering wheel to said steering shaft;
- means mounted to said boss for pressing said boss in a first direction of engaging said steering wheel with said steering shaft, said boss pressing means being engaged with said groove of said steering shaft; and
- means mounted to said boss for pressing said steering shaft in a second direction opposite to said first direction so as to release said steering wheel from said steering shaft.

BRIEF DESCRIPTION OF THE DRAWINGS

FIGS. 7A–7B are views similar to FIG. 4, taken along the line VII—VII in FIG. 3, wherein FIG. 7A shows a first position of the fixing device mounting the steering wheel to a steering shaft, and FIG. 7B shows a second position of the fixing device detaching the steering wheel from the steering shaft;

DETAILED DESCRIPTION OF THE INVENTION

Figure 1:
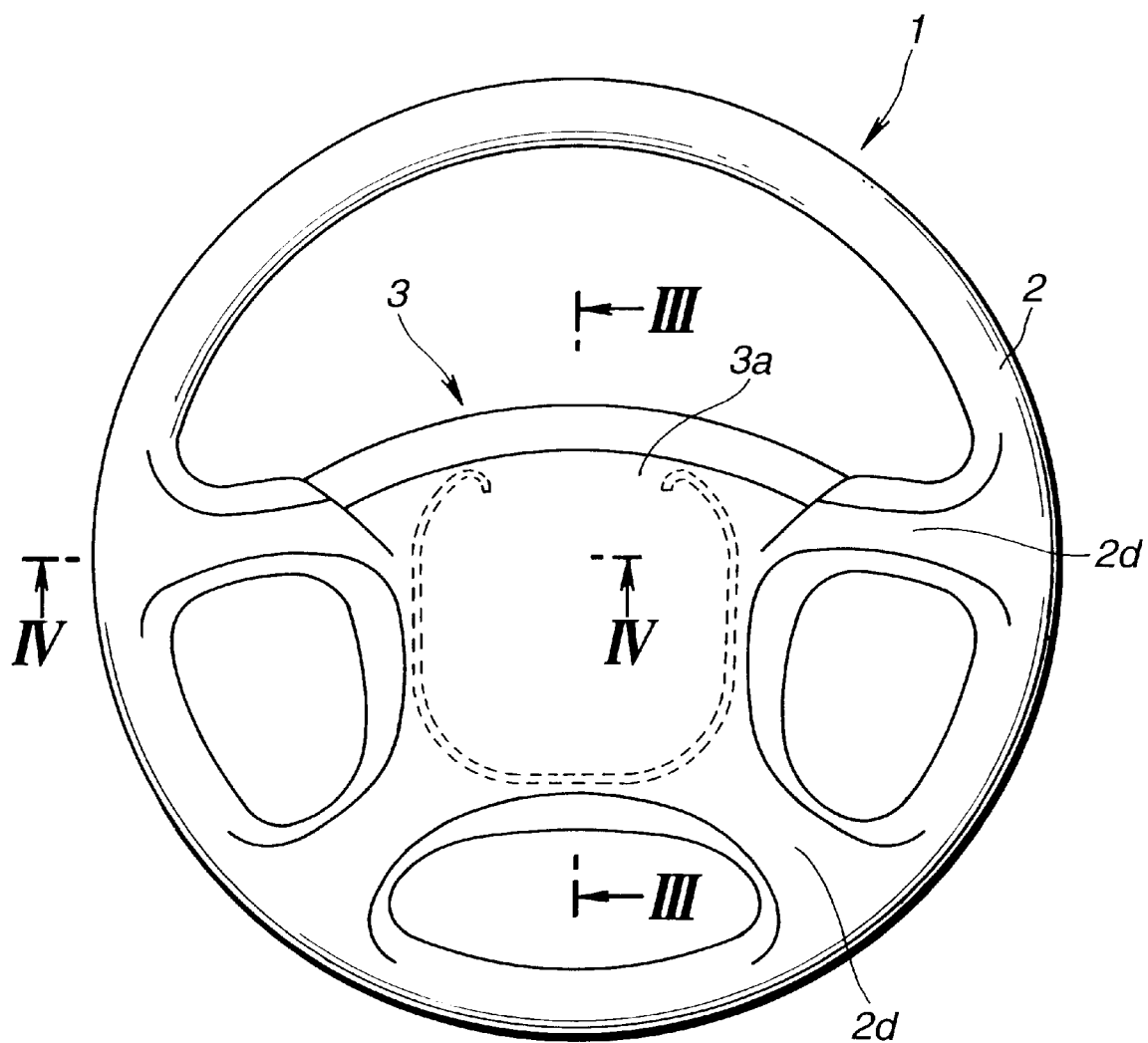
FIG. 1 is a front view showing a steering wheel to which the present invention is applied.

Referring to the drawings, a description will be made with regard to a fixing device for a steering wheel embodying the present invention.

Figure 2:
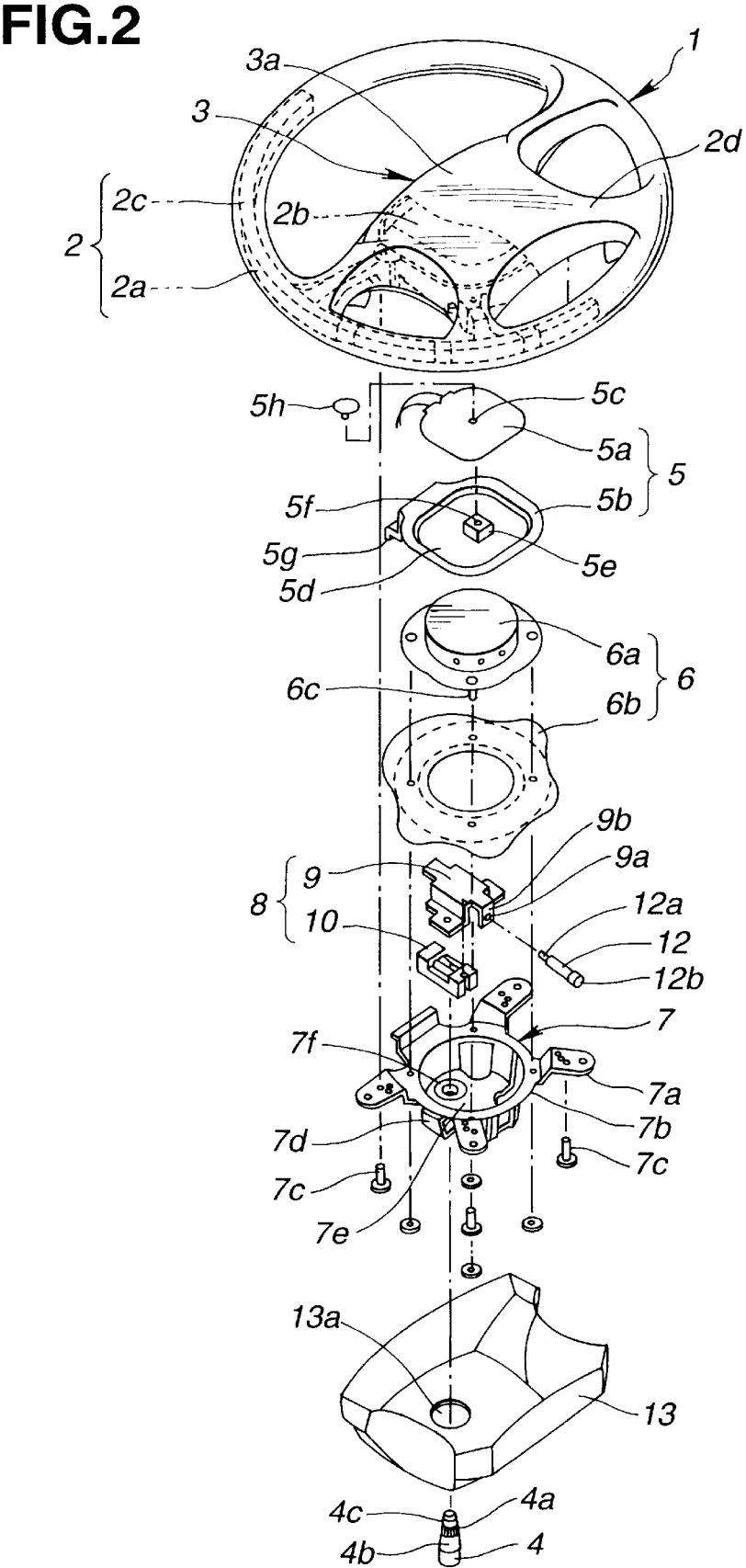
FIG. 2 is an exploded perspective view showing a first embodiment of a fixing device for a steering wheel.

FIGS. 1–7B show a first embodiment of the present invention. Referring to FIGS. 1–2, a steering wheel 1 comprises a steering-wheel main body 2 and an air-bag cover 3 integrated therewith, and are detachably mounted to an upper end of a steering shaft 4 arranged on the side of a vehicle body, not shown.

As shown in FIG. 2, the steering-wheel main body 2 includes a hub core 2a die cast from magnesium alloy or the like, a flap inner 2b obtained by injection molding of a thermoplastic elastomer (TPO), and a skin 2c including a polyurethane integral skin. The flap inner 2b is inserted in a reaction injection mold, into which polyurethane is injected, obtaining the hub core 2a covered with the skin 2c. Integrated with a substantially central portion of the steering-wheel main body 2 is a pad 3a of the air-bag cover 3 supported by spokes 2d, wherein the flap inner 2b is arranged.

A horn switch 5 includes a membrane switch 5a including two polyethylene terephthalate (PET) films superimposed on each other through a dot spacer and having opposite faces with a copper foil or the like placed thereon, and a backup plate 5b. The membrane switch 5a has a through hole 5c in the center thereof, and a recess 5d of the backup plate 5b has a protrusion 5e in the center thereof. A resin clip 5h arranged through the through hole 5c of the membrane switch 5a is press fitted in a mounting hole 5f of the protrusion 5e, obtaining the membrane switch 5a mounted to the backup plate 5b. A mounting lug 5g is arranged on the outer periphery of the backup plate 5b, which serves to fix the horn switch 5 to a boss 7 as will be described later.

An air-bag device 6 housed in the air-bag cover 3 includes an inflator 6a that jets out gas when detecting collision impact and an air bag 6b distended instantaneously by gas out of the inflator 6a. The air bag 6b in fold is mounted, together with the inflator 6a, to the boss 7 by stud bolts 6c.

Figure 5:
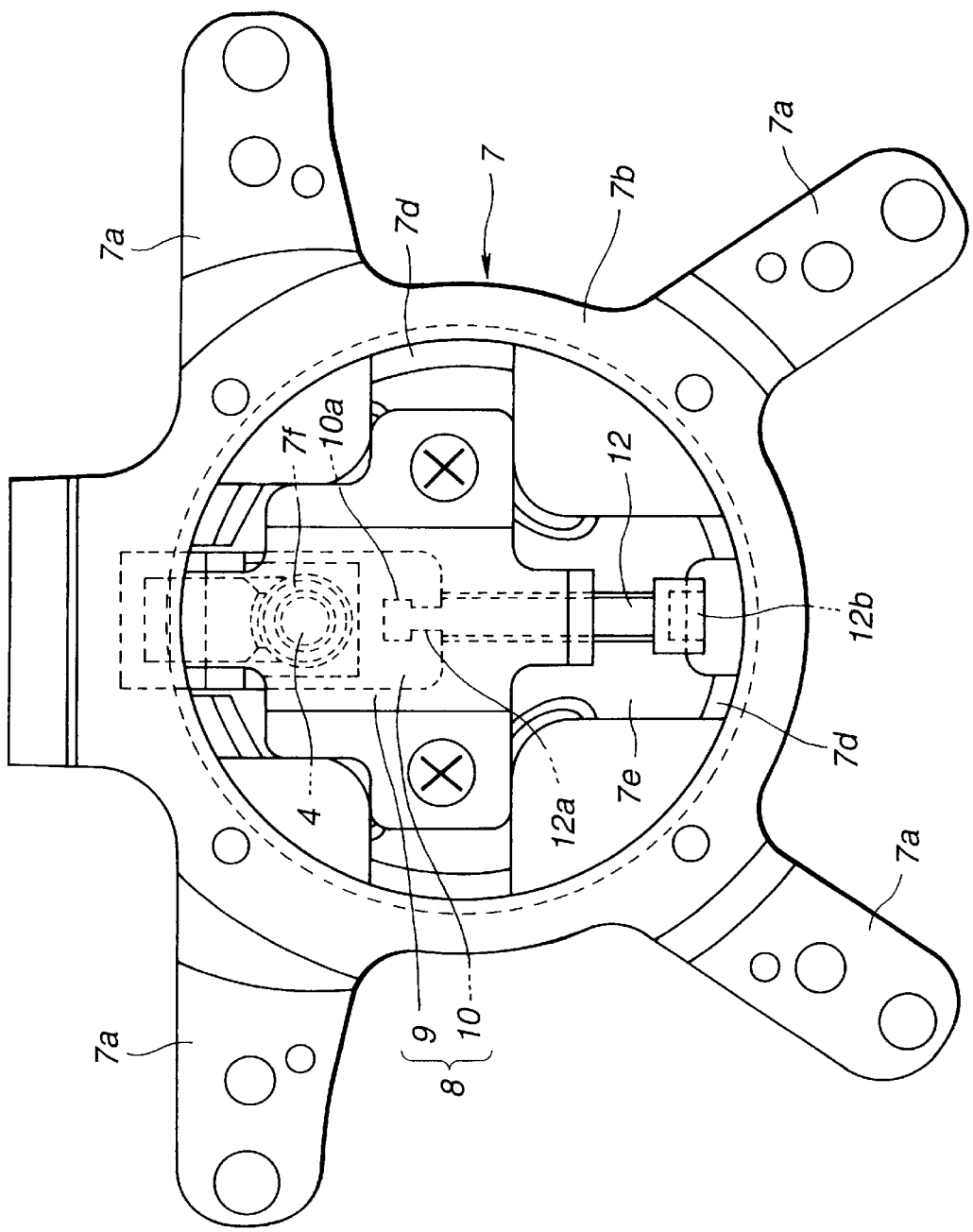
FIG. 5 is a plan view showing a boss used for the fixing device for a steering wheel.

Referring also to FIG. 5, the boss 7 is made of metal, and includes mounting arms 7a in the positions corresponding to the spokes 2d of the steering wheel 1 so as to protrude from a flange 7b. Each mounting arm 7a is fixed to a lower side of the corresponding spoke 2d by a fixture 7c.

Figure 3:
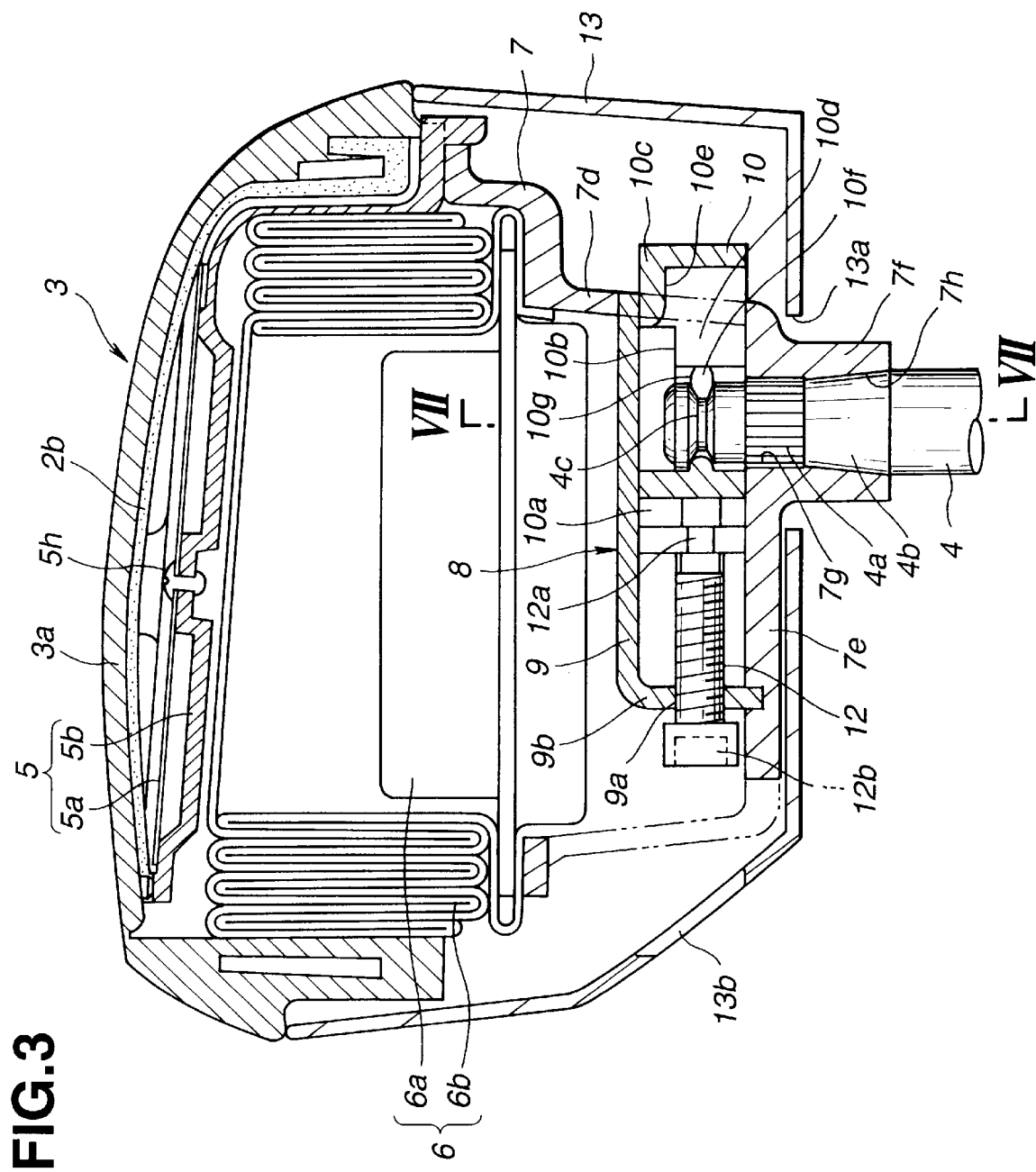
FIG. 3 is a sectional view taken along the line III—III in FIG. 1.

Referring also to FIG. 3, the boss 7 includes a base 7e connected to a lower end of peripheral walls 7d that protrude downwardly from the flange 7b, with which a mounting boss 7f is integrated to mount the steering wheel 1 to the steering shaft 4.

The mounting boss 7f is of the cylindrical shape, and has an inner peripheral face having an upper portion formed with a serration 7g and a lower portion formed with a taper hole 7h with downwardly increasing diameter. When inserting from the taper hole 7h an upper end of the steering shaft 4 in the mounting boss 7f, a serration or a rotation stopper 4a formed at an upper end of the steering shaft 4 is engaged with a serration 7g formed on the inner periphery of the boss 7f, obtaining close fitting of a taper or a fit-amount restrainer 4b formed below the serration 4a in the taper hole 7h of the mounting boss 7f.

An annular groove 4c is formed at an upper end of the steering shaft 4 that protrudes upwardly from the mounting boss 7f, with which a protrusion 10f of a slider 10 arranged above the base 7e is engaged.

A fixing device 8 comprises the protrusion 10f of the slider 10 and a casing 9 fixed to an upper side of the base 7e of the boss 7 for slidably receiving the slider 10 therein.

The casing 9 is formed with a leg 9b having a screw hole 9a, through which a screw pin 12 is arranged to obtain slide movement of the slider 10.

As shown in FIGS. 3 and 5, the screw pin 12 has an end formed with a groove 12a, through which the screw pin 12 is engaged with a T-shaped groove 10a formed at an end of the slider 10.

Figure 6:
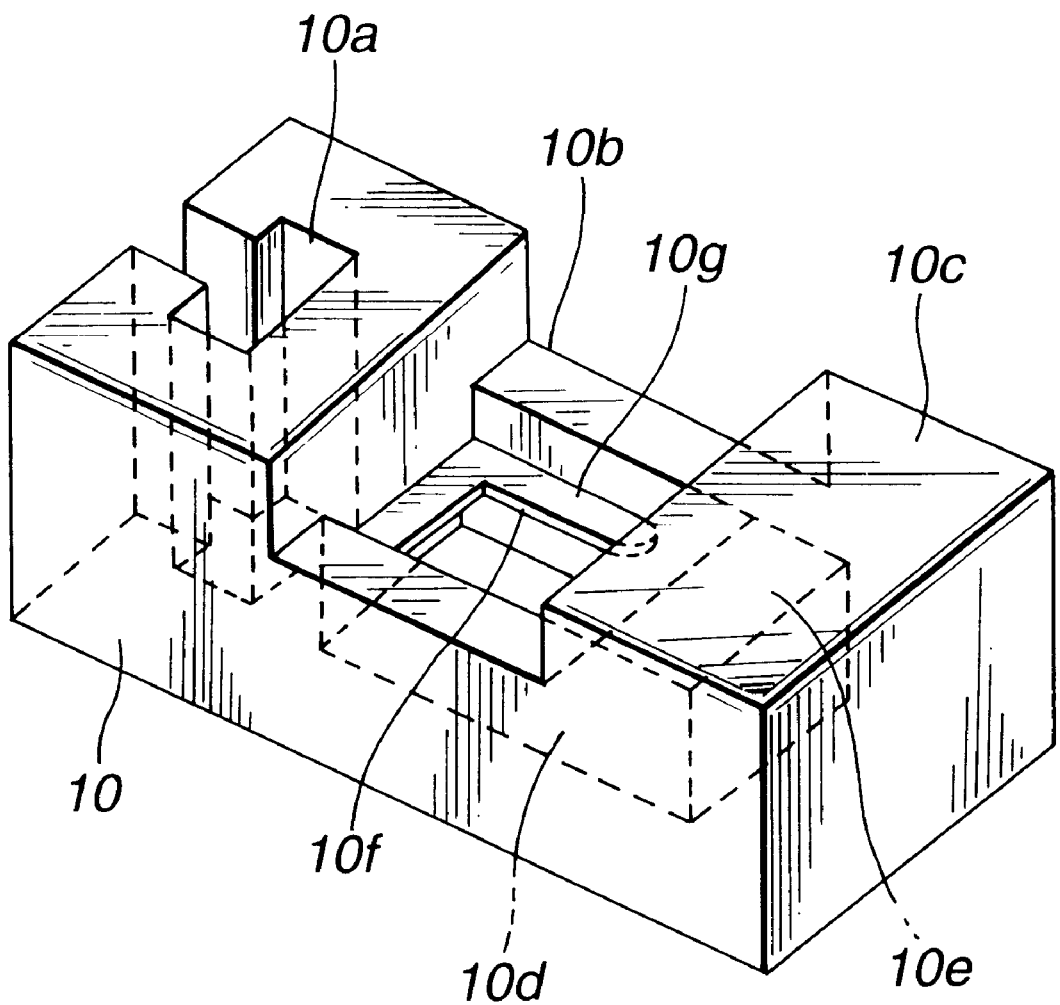
FIG. 6 is a perspective view showing a slider constituting the fixing device for a steering wheel.

Referring to FIG. 6, the slider 10 is formed like a solid block made of resin or metal, and has a recess 10b substantially in the center thereof and a bridge 10c in an upper portion of another end thereof.

Formed in the center of the recess 10b is an inner recess 10d with a lower-side opening extending to the bridge 10c, and formed with a lower side of the bridge 10c is a taper face 10e that is higher on the side of the recess 10b and lower on another side of the slider 10 as shown in FIG. 3. The taper face 10e constitutes a pressing device. The protrusion 10f having substantially an U-shape is arranged on opposite faces of the inner recess 10d and on an end face thereof connecting thereto.

Figure 4:
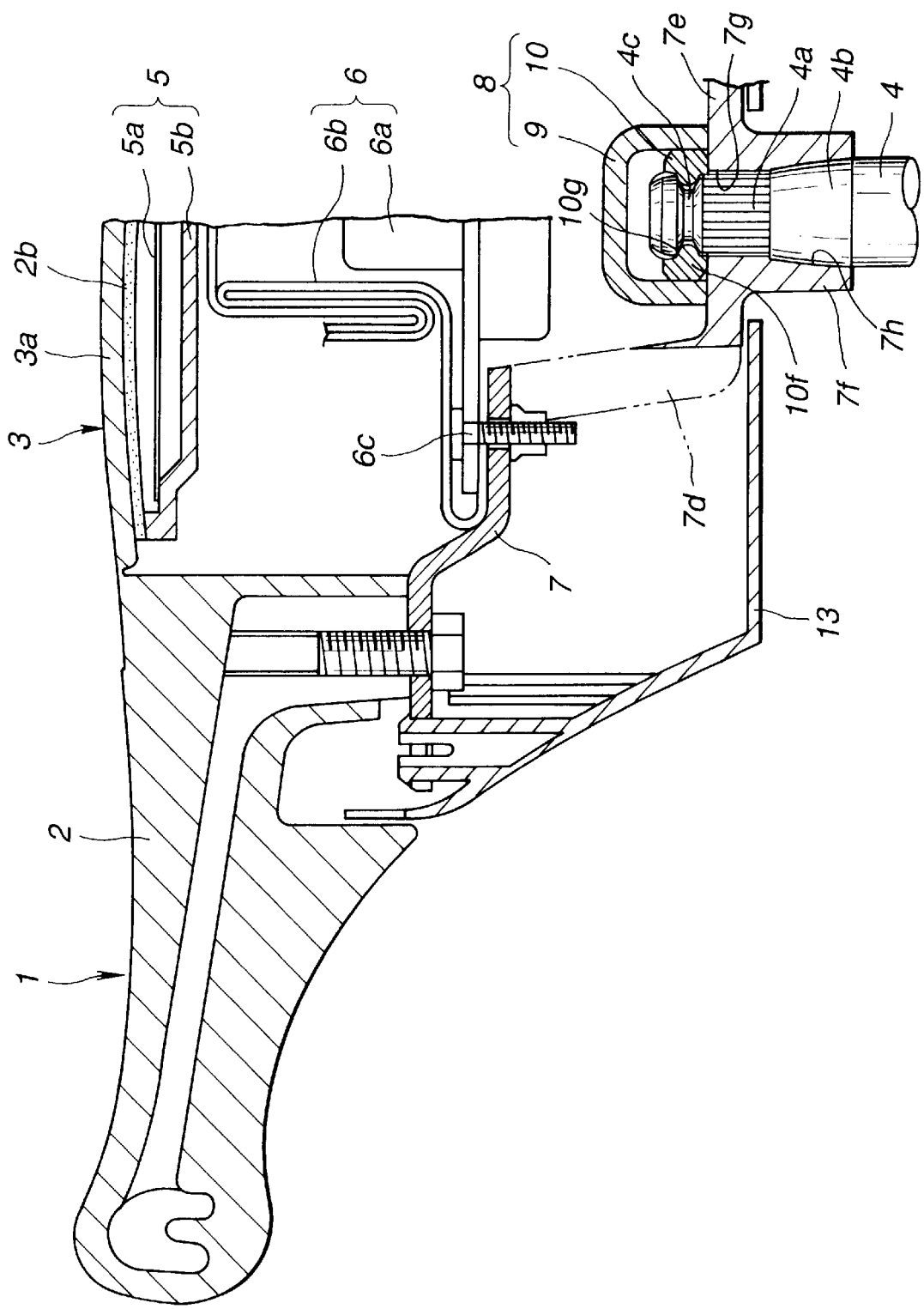
FIG. 4 is a view similar to FIG. 3, taken along the line IV—IV in FIG. 1.

An end of the protrusion 10f fails to reach a portion of the inner recess 10d below the bridge 10c so as not to form an obstacle when inserting an upper end of the steering shaft 4 in the inner recess 10d. Referring also to FIG. 4, opposite faces of the protrusion 10f have substantially semi-circular sections to engage with the annular groove 4c formed at the upper end of the steering shaft 4 from both sides thereof.

The protrusion 10f is inclined to be higher on the side of the T-shaped groove 10a and lower on the side of the bridge 10c. When rotating the screw pin 12 to move the slider 10 forward or in the direction of intersecting an axis of the steering shaft 4, the end of the steering shaft 4 is drawn into the inside of the slider 10 by wedge action of an inclined face log.

Next, the operation of the fixing device for a steering wheel will be described.

The steering-wheel main body 2 and the air-bag cover 3 are integrally formed in advance by reaction injection molding. In another process, the boss 7 with the air-bag device 6 assembled thereto is mounted in the air-bag cover 3. With the steering-wheel main body 2 having the boss 7 mounted thereto, the steering wheel 1 is provided to a vehicle-body assembling process.

At that time, the fixing device 8 comprising the casing 9 and the slider 10 are mounted in advance on the upper side of the base 7e of the boss 7, and the boss 7 is covered with a body cover 13 engaged therewith from below.

In the vehicle-body assembling process, when the steering wheel 1 is mounted to the steering shaft 4 arranged on the side of the vehicle body, the upper end of the steering shaft 4 is inserted in the mounting boss 7f of the base 7e of the boss 7 from a through hole 13a of the body cover 13.

At that time, the slider 10 is in the backward position where the inner recess 10d arranged below the bridge 10c of the slider 10 corresponds to the mounting boss 7f, having no interference of the upper end of the steering shaft 4 with the protrusion 10f.

Moreover, with the upper end of the steering shaft 4 fit in the mounting boss 7f, the serration 7g of the mounting boss 7f is engaged with the serration 4a of the steering shaft 4, obtaining close fitting of the taper 4b of the steering shaft 4 in the taper hole 7h of the mounting boss 7f.

Figure 7A:
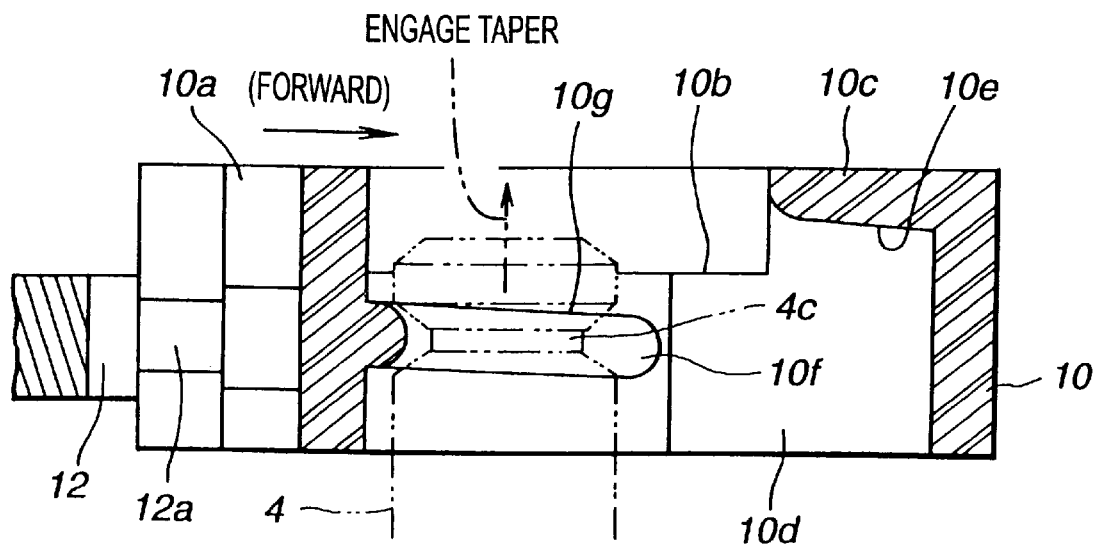

Then, a tool, not shown, such as a hexagonal wrench is inserted from a tool hole 13b of a side face of the body cover 13 to engage with a polygonal hole 12b of a head of the screw pin 12. Referring to FIG. 7A, rotating the screw pin 12 by the tool, the slider 10 is moved forward or in the direction of intersecting the axis of the steering shaft 4.

This makes the protrusion 10f protruding in the inner recess 10d of the slider 10 engage with the annular groove 4c formed at the upper end of the steering shaft 4. In that state, further forward movement of the slider 10 causes the upper end of the steering shaft 10 to be drawn into the inside of the slider 10 by wedge action of the inclined face 10g of the upper side of the protrusion 10f. Thus, the inner surface of the taper hole 7h of the mounting boss 7f and the taper 4b of the steering shaft 4 are pressed further to each other to absorb a backlash between the serration 7g of the mounting boss 7f and the serration 4a of the steering shaft 4. This results in mounting of the steering wheel 1 to the steering shaft 4 without backlash.

Figure 7B:
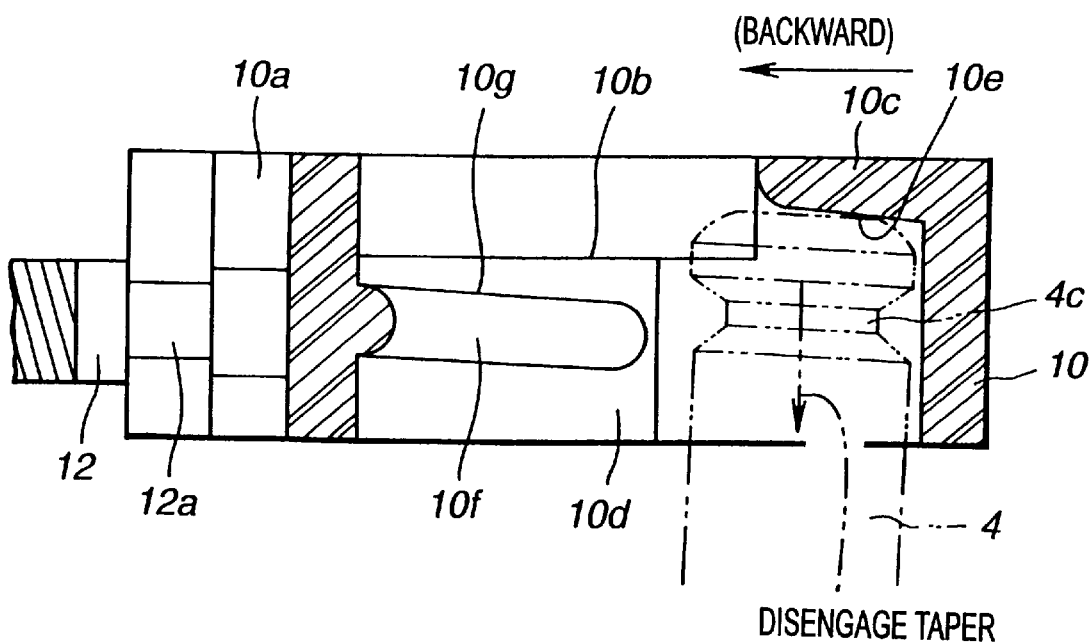

On the other hand, referring to FIG. 7B, when detaching the steering wheel 1 from the steering shaft 4, the screw pin 12 is rotated in the opposite direction by the tool to move the slider 10 backward.

This draws the protrusion 10f of the slider 10 from the annular groove 4c of the steering shaft 4. With the slider 10 moved backward further, the taper face 10e of the lower side of the bridge 10c abuts on the upper end face of the steering shaft 4 to press the steering shaft 4 downward. A reaction force produced at that time operates to push up the boss 7 so as to disengage the taper hole 7h of the mounting boss 7f and the taper 4b of the steering shaft 4 from each other, enabling easy detachment of the steering wheel 1 from the steering shaft 4.

Figure 8A:
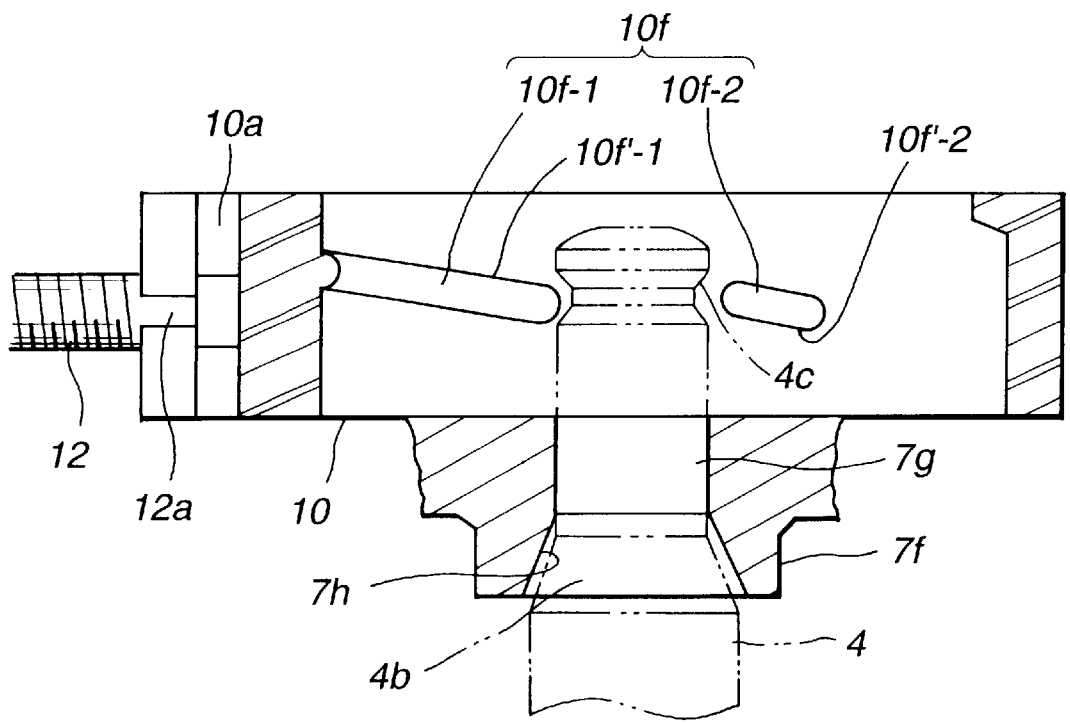
FIGS. 8A–8B are views similar to FIGS. 7A–7B, showing a second embodiment of the present invention.
Figure 8B:
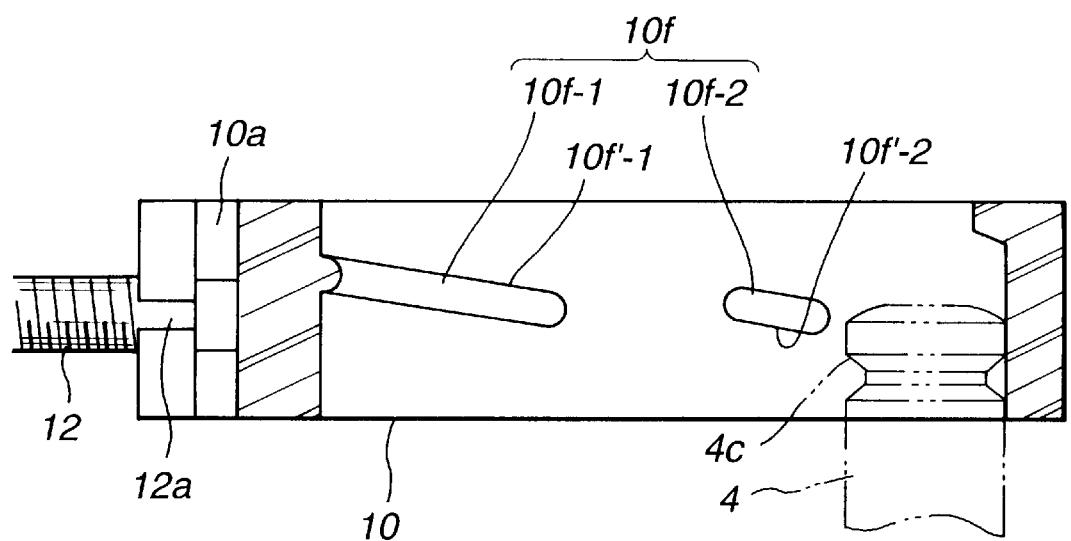

FIGS. 8A–8B show a second embodiment of the present invention wherein the protrusion 10f of the slider 10 comprises two divided portions, i.e. a tightening-side or first protrusion 10f-1 as a fixing slider and a loosening-side or second protrusion 10f-2 as a pressing slider.

The tightening-side protrusion 10f-1 constitutes a fixing device disposed on the side of the screw 12 to engage with the annular groove 4c of the steering shaft 4. The upper end of the steering shaft 4 is drawn into the inside of the slider 10 by wedge action of an upper inclined face 10f'-1 of the tightening-side protrusion 10f-1 for fixing.

The loosening-side protrusion 10f-2 constitutes a pressing device disposed on the side of the end wall of the slider 10 to engage with the annular groove 4c by backward movement of the slider 10 through the screw 12. The steering shaft 4 is pressed downward by wedge action of a lower inclined face 10f'-2 of the loosening-side protrusion 10f-2. A reaction force produced at that time operates to push up the boss 7 so as to disengage the taper 4b of the steering shaft 4 and the taper hole 7h of the mounting boss 7f from each other.

In the second embodiment, referring to FIG. 8A, when mounting the steering wheel 1 to the steering shaft 4 arranged on the vehicle-body side in the vehicle-body assembling process, the upper end of the steering shaft 4 is located in a first space X between the tightening-side protrusion 10f-1 and the loosening-side protrusion 10f-2 with respect to the taper hole 7h of the mounting boss 7f. Rotating the screw pin 12 to move the slider 10 that is in the backward position forward or in the direction of intersection the axis of the steering shaft 4, the tightening-side protrusion 10f-1 is engaged with the annular groove 4c from the side. With further forward movement of the slider 10, the upper end of the steering shaft 4 is drawn into the inside of the slider 10 by wedge action of the upper inclined face 10f'-1 of the tightening-side protrusion 10f-1. Thus, the inner surface of the taper hole 7h of the mounting boss 7f and the taper 4b of the steering shaft 4 are pressed to each other, obtaining mounting of the steering wheel 1 to the steering shaft 4 without backlash.

Therefore, the upper inclined face 10f'-1 of the tightening-side protrusion 10f-1 and the annular groove 4c of the steering shaft 7 constitute a fixing device for pressing the boss 7 in a first direction of engaging the steering wheel 1 with the steering shaft 4.

On the other hand, referring to FIG. 8B, when detaching the steering wheel 1 from the steering shaft 4, the screw pin 12 is rotated in the opposite direction to move the slider 10 backward.

This draws the tightening-side protrusion 10f-1 from the annular groove 4c of the steering shaft 4. With further backward movement of the slider 10, the loosening-side protrusion 10f-2 is engaged with the annular groove 4c. The steering shaft 4 is pressed downward by wedge action of the lower inclined face 10f'-2 of the loosening-side protrusion 10f-2. A reaction force produced at that time operates to push up the boss 7 so as to disengage the taper 4b of the steering shaft 4 and the taper hole 7h of the mounting boss 7f from each other, enabling easy detachment of the steering wheel 1 from the steering shaft 4.

Therefore, the lower inclined face 10f'-2 of the loosening-side protrusion 10f-2 and the annular groove 4c of the steering shaft 4 constitute a pressing device for pressing the steering shaft 4 downward or in a second direction opposite to the first direction to release the steering wheel 1 from the steering shaft 4.

Figure 9:
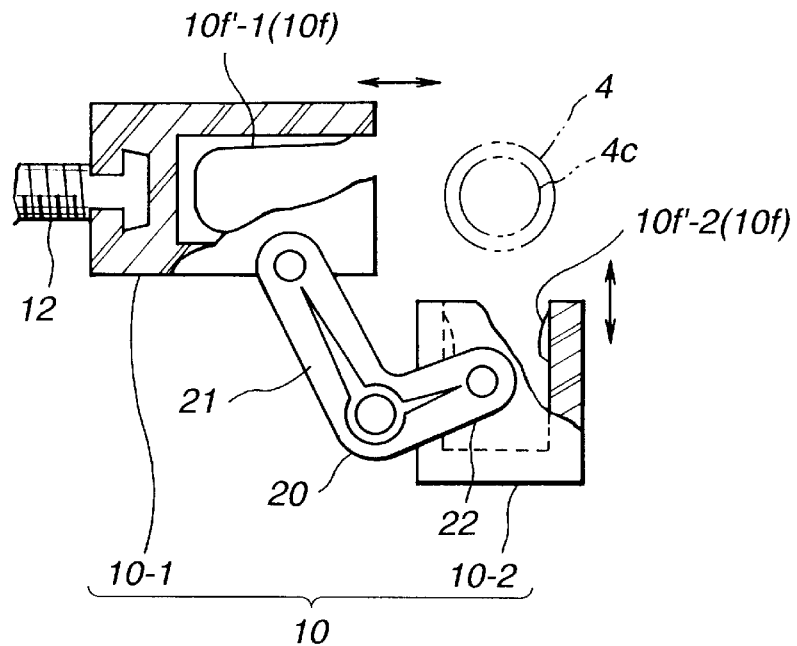
FIG. 9 is a fragmentary plan view showing a third embodiment of the present invention.

FIG. 9 shows a third embodiment of the present invention wherein the slider 10 comprises two divided portions, i.e. a first housing 10-1 and a second housing 10-2 with respect to the second embodiment as shown in FIGS. 8A–8B. In order to dispose the second housing 10-2 substantially 90° offset with respect to the first housing 10-1, the two are connected by a substantially L-shaped link 20 pivoted on the boss 7. The first and second housings 10-1, 10-2 can sequentially be operated by the screw pin 12 of the first housing 10-1.

Specifically, when moving the screw pin 12 forward, the upper inclined face 10f'-1 of the first housing 10-1 is engaged with the annular groove 4c of the steering shaft 4 to draw the upper end of the steering shaft 4 into the inside of the slider 10. In that state, when moving the screw 12 backward, the first housing 10-1 is moved backward, and the second housing 10-2 is moved forward or to the steering shaft 4 through the link 20. Thus, the upper inclined face 10f'-1 of the second housing 10-2 is engaged with the annular groove 4c of the steering shaft 4 to push up the mounting boss 7 with respect to the steering shaft 4, enabling easy detachment of the steering wheel 1 from the steering shaft 4.

In order to obtain smooth sequential operation of the first and second housings 10-1, 10-2 by the screw pin 12, the link 20 is formed to have one arm 21 longer than another arm 22, which contributes to a relative reduction in the operation load of the screw pin 12 based on the principle of a lever.

Figure 10:
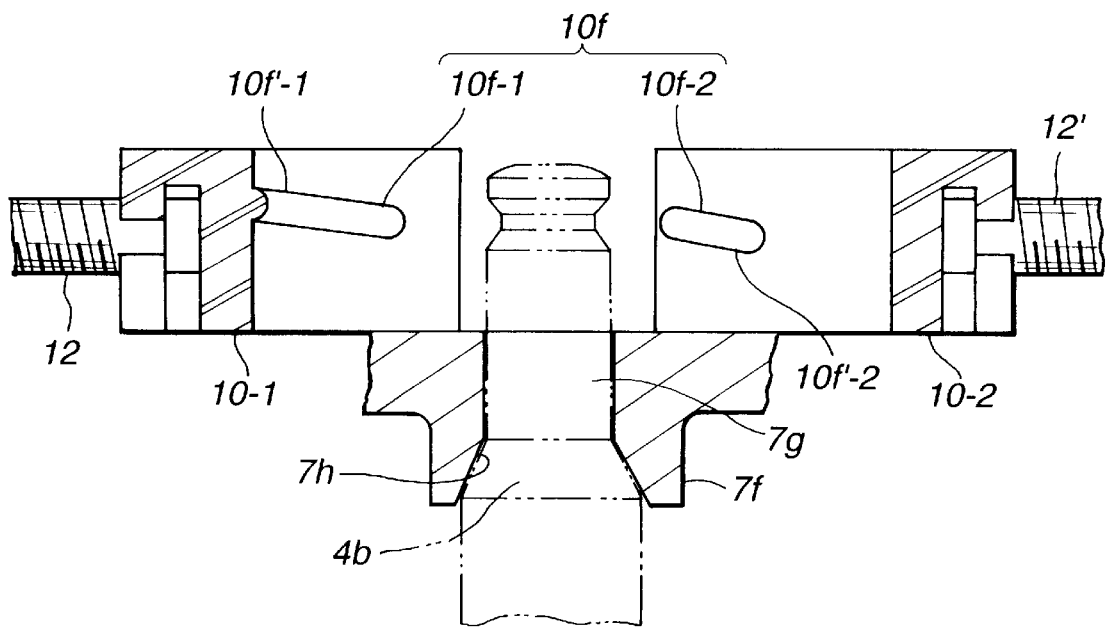
FIG. 10 is a view similar to FIGS. 8A–8B, showing a fourth embodiment of the present invention.

FIG. 10 shows a fourth embodiment of the present invention wherein the slider 10 comprises two divided portions, i.e. a first housing 10-1 formed with a tightening-side protrusion 10f-1 and a second housing 10-2 formed with a loosening-side protrusion 10f-2 with respect to the second embodiment as shown in FIGS. 8A–8B. In addition to the screw pin 12 for operating the first housing 10-1, a screw pin 12' for operating the second housing 10-2 is arranged separately.

Therefore, as shown in FIG. 10, when moving the first housing 10-1 forward or to the steering shaft 4 by the screw pin 12 for mounting the steering wheel 1 to the steering shaft 4, the second housing 10-2 should be moved backward in advance by the screw pin 12'. On the other hand, when moving the second housing 10-2 forward or to the steering shaft 4 for detaching the steering wheel 1 from the steering shaft 4, the first housing 10-1 should be moved backward in advance by the screw pin 12.

Having described the present invention with regard to the preferred embodiments, it is noted that the present invention is not limited thereto, and various changes and modifications can be made without departing from the scope of the present invention. By way of example, in the embodiments, the present invention is applied to the steering wheel 1 including the steering-wheel main body 2 and the pad 3a of the air-bag cover 3 integrated therewith. Alternatively, the present invention is applicable to a steering wheel including a steering-wheel main body and a pad of an air-bag cover separately arranged therefrom.

What is claimed is:

1. An arrangement comprising:
  a steering shaft having an axis and an end formed with a groove in a direction of intersecting said axis, said end including a first rotation stopper and a first fit-amount restrainer;
  a steering wheel;
  a boss fixed to said steering wheel, said boss including a second rotation stopper engaged with said first rotation stopper of said steering shaft and a second fit-amount restrainer abutting on said first fit-amount restrainer of said steering shaft, said boss detachably mounting said steering wheel to said steering shaft;
  a fixing device mounted to said boss, said fixing device pressing said steering shaft in a first direction which engages said steering wheel and said boss with said steering shaft, said fixing device being engaged with said groove of said steering shaft; and
  a pressing device formed with said fixing device, said pressing device pressing said steering shaft in a second direction opposite to said first direction when releasing said steering wheel from said steering shaft;
  wherein said pressing device is arranged inside said fixing device, and
  wherein said pressing device comprise a taper face.

2. An arrangement as claimed in claim 1, wherein said fixing device comprises a first slider.

3. An arrangement as claimed in claim 2, wherein said first slider includes a substantially U-shaped protrusion.

4. An arrangement as claimed in claim 2, wherein said first slider includes a first protrusion engaged with said groove of said steering shaft and being slidable in a direction of intersection of said axis of said steering shaft, and a housing having said first protrusion formed therewith.

5. An arrangement as claimed in claim 1, wherein said pressing device comprises a second slider including a second protrusion engaged with said groove of said steering shaft and being slidable in a direction intersecting said axis of said steering shaft, and a second housing having said second protrusion formed therewith.

6. An arrangement as claimed in claim 5, wherein said first and second housings are connected by a substantially L-shaped link pivoted on said boss.

7. An arrangement as claimed in claim 6 further comprising a first screw pin for operating said first housing and a second screw pin for operating said second housing.

* * * * *